(12) United States Patent
Kim

(10) Patent No.: US 12,056,390 B2
(45) Date of Patent: Aug. 6, 2024

(54) MEMORY CONTROLLER, STORAGE DEVICE, AND HOST DEVICE

(71) Applicant: SK hynix Inc., Gyeonggi-do (KR)

(72) Inventor: Byung Jun Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 122 days.

(21) Appl. No.: 17/845,939

(22) Filed: Jun. 21, 2022

(65) Prior Publication Data
US 2023/0096111 A1 Mar. 30, 2023

(30) Foreign Application Priority Data

Sep. 17, 2021 (KR) .................. 10-2021-0125184
Mar. 22, 2022 (KR) .................. 10-2022-0035381

(51) Int. Cl.
*G06F 3/06* (2006.01)
(52) U.S. Cl.
CPC .......... *G06F 3/0656* (2013.01); *G06F 3/0604* (2013.01); *G06F 3/0679* (2013.01)
(58) Field of Classification Search
None
See application file for complete search history.

(56) References Cited

U.S. PATENT DOCUMENTS

| | | | | |
|---|---|---|---|---|
| 7,184,241 B1* | 2/2007 | Mallary | .................. | G11B 5/024 360/78.04 |
| 9,734,066 B1* | 8/2017 | Indupuru | .............. | G06F 12/128 |
| 10,884,935 B1* | 1/2021 | Doddaiah | ........... | G06F 12/0846 |
| 11,099,754 B1* | 8/2021 | Mallick | .................... | G06F 3/061 |
| 2002/0057446 A1* | 5/2002 | Long | ...................... | G06F 9/3879 712/E9.067 |
| 2013/0138879 A1* | 5/2013 | Kulkarni | ............. | G06F 13/4291 711/E12.001 |
| 2018/0074715 A1* | 3/2018 | Farmahini-Farahani | | G06F 13/1668 |
| 2020/0089427 A1* | 3/2020 | Lee | ........................ | G06F 3/0658 |
| 2022/0229780 A1* | 7/2022 | Martincic | ............. | G06F 9/5083 |

FOREIGN PATENT DOCUMENTS

KR 10-2018-0062247 A 6/2018
KR 10-2021-0026431 A 3/2021

OTHER PUBLICATIONS

JESD220E Universal Flash Storage (UFS) 3.1, JEDEC Solid State Tech. (2020).

* cited by examiner

*Primary Examiner* — Stephanie Wu
(74) *Attorney, Agent, or Firm* — IP & T GROUP LLP

(57) ABSTRACT

According to an embodiment of the present technology, a storage device may include a main memory device, a buffer memory device including a plurality of areas and operating as a buffer of the main memory device, and a memory controller configured to change one or more of respective uses of the plurality of areas in response to a preparation command indicating that one or more read commands for requesting data stored in the main memory device are to be provided, which is received from an external host.

19 Claims, 18 Drawing Sheets

| Transaction Specific Fields for CLEAR FLAG OPCODE | | | |
|---|---|---|---|
| 12<br>07h | 13<br>FLAG IDN | 14<br>INDEX | 15<br>SELECTOR |
| 16<br>Reserved | 17<br>Reserved | 18<br>Reserved | 19<br>Reserved |
| 20 | 21 | 22 | 23 |
| Reserved | | | |
| 24 | 25 | 26 | 27 |
| Reserved | | | |

FIG. 6

| QUERY FUNCTION | |
|---|---|
| 00h | Reserved |
| 01h | STANDARD READ REQUEST |
| 02h~3Fh | Reserved |
| 40-7Fh | Vendor Specific Read Functions |
| 80h | Reserved |
| 81h | STANDARD WRITE REQUEST |
| 82h-BFh | Reserved |
| C0h-FFh | Vendor Specific Write Functions |

FIG. 7

| Transaction Specific Fields for Standard Write Request | | | |
|---|---|---|---|
| 12 OPCODE | 13 OSF[0] | 14 OSF[1] | 15 OSF[2] |
| 16 OSF[3] | 17 OSF[4] | 18 (MSB) OSF[5] | 19 (LSB) |
| 20 (MSB) | 21 OSF[6] | 22 | 23 (LSB) |
| 24 (MSB) | 25 OSF[7] | 26 | 27 (LSB) |

FIG. 8

Query Function opcode values

| OPCODE | Operation | QUERY FUNCTION |
|---|---|---|
| 00h | NOP | Any value |
| 01h | READ DESCRIPTOR | STANDARD READ REQUEST |
| 02h | WRITE DESCRIPTOR | STANDARD WRITE REQUEST |
| 03h | READ ATTRIBUTE | STANDARD READ REQUEST |
| 04h | WRITE ATTRIBUTE | STANDARD WRITE REQUEST |
| 05h | READ FLAG | STANDARD READ REQUEST |
| 06h | SET FLAG | STANDARD WRITE REQUEST |
| 07h | CLEAR FLAG | STANDARD WRITE REQUEST |
| 08h | TOGGLE FLAG | STANDARD WRITE REQUEST |
| 09h~EFh | Reserved | Reserved |
| F0h~FFh | Vendor Specific | Vendor Specific |

FIG. 9

| Transaction Specific Fields for CLEAR FLAG OPCODE |||||
|---|---|---|---|
| 12<br>06h | 13<br>FLAG IDN | 14<br>INDEX | 15<br>SELECTOR |
| 16<br>Reserved | 17<br>Reserved | 18<br>Reserved | 19<br>Reserved |
| 20 | 21 | 22 | 23 |
| Reserved ||||
| 24 | 25 | 26 | 27 |
| Reserved ||||

FIG. 10

| Transaction Specific Fields for CLEAR FLAG OPCODE |||||
|---|---|---|---|
| 12<br>07h | 13<br>FLAG IDN | 14<br>INDEX | 15<br>SELECTOR |
| 16<br>Reserved | 17<br>Reserved | 18<br>Reserved | 19<br>Reserved |
| 20 | 21 | 22 | 23 |
| Reserved ||||
| 24 | 25 | 26 | 27 |
| Reserved ||||

MEMORY CONTROLLER, STORAGE DEVICE, AND HOST DEVICE

CROSS-REFERENCE TO RELATED APPLICATION

The present application claims priority under 35 U.S.C. § 119(a) to Korean patent application number 10-2021-0125184, filed on Sep. 17, 2021 and Korean patent application number 10-2022-0035381, filed on Mar. 22, 2022, the entire disclosures of which are incorporated herein by reference.

BACKGROUND

1. Field of Invention

The present disclosure relates to an electronic device, and more particularly, to a memory controller, a storage device, and a host device.

2. Description of Related Art

A storage device is a device that stores data under control of a host device such as a computer or a smartphone. A storage device may include a memory device storing data and a memory controller controlling the memory device. The memory device may be classified into a volatile memory device and a nonvolatile memory device.

The volatile memory device may be a device that stores data only when power is supplied and loses the stored data when the power supply is cut off. The volatile memory device may include a static random access memory (SRAM), a dynamic random access memory (DRAM), and the like.

The nonvolatile memory device is a device that does not lose data even though power is cut off. The nonvolatile memory device includes a read only memory (ROM), a programmable ROM (PROM), an electrically programmable ROM (EPROM), an electrically erasable and programmable ROM (EEPROM), a flash memory, and the like.

As electronic devices that require extensive data use are developed, a storage device used therefor also requires a high level of performance. In particular, performance for a read operation may be more important because the performance for the read operation is performance shown to a user.

SUMMARY

An embodiment of the present disclosure provides a memory controller, a storage device, and a host device capable of performing an improved read operation.

According to an embodiment of the present disclosure, a storage device may include a main memory device, a buffer memory device including a plurality of areas and operating as a buffer of the main memory device, and a memory controller configured to change one or more of respective uses of the plurality of areas in response to a preparation command indicating that one or more read commands for requesting data stored in the main memory device are to be provided, which is received from an external host.

According to an embodiment of the present disclosure, a memory controller that controls a main memory device and a buffer memory device operating as a buffer of the main memory device and including a plurality of areas, may include a host interface configured to receive a preparation command indicating that one or more read commands for requesting data stored in the main memory device are to be provided from an external host, and a buffer memory device interface configured to change one or more respective uses of the plurality of areas in response to the preparation command.

According to an embodiment of the present disclosure, a host device may include a host memory configured to store therein commands generated according to a request of a user, and a host controller configured to provide a storage device with a preparation command indicating that one or more read commands are scheduled to be provided to the storage device, based on the stored commands in the host memory which include the one or more read commands, wherein the preparation command comprises a basic header segment including information indicating that the preparation command is a query request for setting an operation mode of the storage device and information indicating a type of a query function associated with the operation mode, and a transaction specific field including information on a flag indicating whether an intensive read mode is activated.

According to an embodiment of the present disclosure, an operating method of a controller, the method may include adjusting, in response to a preparation request, a size of a section within a buffer, and controlling, in response to a read request subsequent to the preparation request, a memory device to perform a read operation while buffering, into the size-adjusted section, data related to the read operation.

According to an embodiment of the present disclosure, an operating method of a host, the method may include providing a memory system with a preparation request for the system to adjust a size of a section within a buffer arranged in the system, and providing, after the providing of the preparation request, the system with a read request for the system to perform a read operation while buffering, into the size-adjusted section, data related to the read operation.

The present technology provides a memory controller, a storage device, and a host device capable of performing an improved read operation.

BRIEF DESCRIPTION OF THE DRAWINGS

FIG. 6 is a diagram illustrating a type of a query function and a field value according to an embodiment of the present disclosure.

FIG. 7 is a diagram illustrating a structure of a transaction specific field when the query function of the query request is a standard write request according to an embodiment of the present disclosure.

FIG. 8 is a diagram illustrating a type of an operation code (opcode) of the query function according to an embodiment of the present disclosure.

FIG. 9 is a diagram illustrating a structure of a transaction specific field of a flag setting query request according to an embodiment of the present disclosure.

FIG. 10 is a diagram illustrating a structure of a transaction specific field of a flag clear query request according to an embodiment of the present disclosure.

DETAILED DESCRIPTION

Specific structural or functional descriptions of embodiments according to the concept which are disclosed in the present specification are illustrated only to describe the embodiments according to the concept of the present disclosure. The embodiments according to the concept of the present disclosure may be carried out in various forms and should not be construed as being limited to the embodiments described in the present specification.

Figure 1:
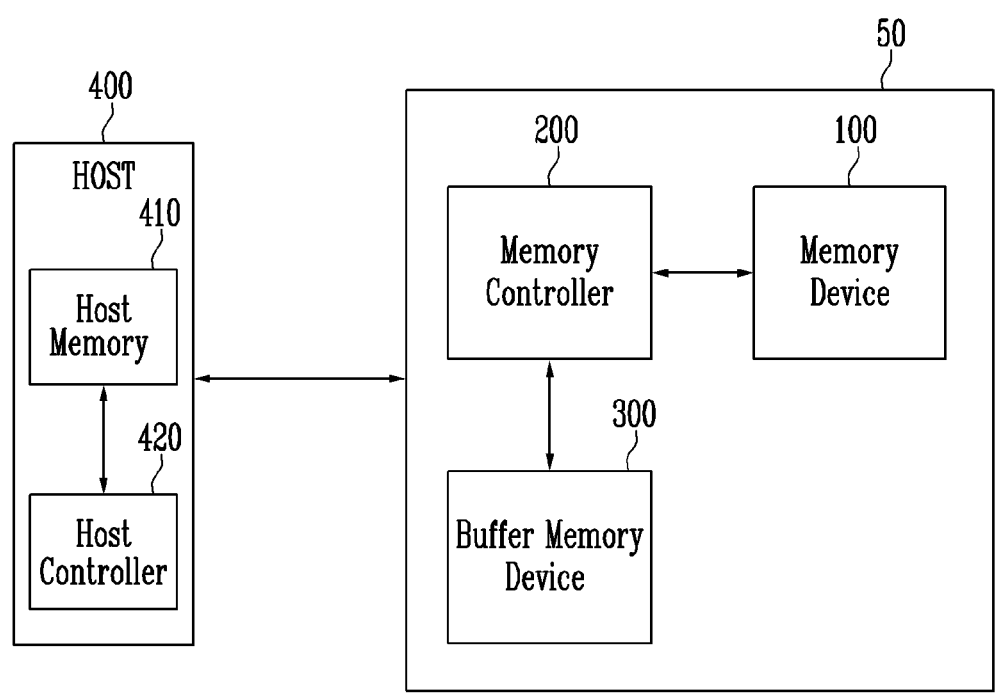
FIG. 1 is a diagram illustrating a host device and a storage device according to an embodiment of the present disclosure.

FIG. 1 is a diagram illustrating a host device and a storage device according to an embodiment of the present disclosure.

Referring to FIG. 1, the storage device 50 may include a memory device 100, a memory controller 200, and a buffer memory device 300. The storage device 50 may be a device that stores data under control of a host 400 such as a cellular phone, a smartphone, an MP3 player, a laptop computer, a desktop computer, a game player, a TV, a tablet PC, or an in-vehicle infotainment system. Alternatively, the storage device 50 may be a device that stores data under control of the host 400 that stores high-capacity data in one place, such as a server or a data center.

The storage device 50 may be manufactured as one of various types of storage devices according to a host interface that is a communication method with the host 400. For example, the storage device 50 may be configured as one of various types of storage devices such as an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-e or PCIe) card type storage device, a compact flash (CF) card, a smart media card, and a memory stick.

The storage device 50 may be manufactured as any of various types of packages. For example, the storage device 50 may be manufactured as any of various package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 operates under control of the memory controller 200. At this time, the memory device 100 may be referred to as a main memory device to distinguish the memory device 100 from the buffer memory device 300. The memory device 100 may include a memory cell array (not shown) including a plurality of memory cells that store data.

Each of the memory cells may be configured as a single level cell (SLC) that stores one data bit, a multi-level cell (MLC) that stores two data bits, a triple level cell (TLC) that stores three data bits, or a quad level cell (QLC) capable of storing four data bits The memory cell array (not shown) may include a plurality of memory blocks. Each memory block may include a plurality of memory cells. Each memory block may include a plurality of pages. In an embodiment, the page may be a unit for storing data in the memory device 100 or reading data stored in the memory device 100. The memory block may be a unit for erasing data.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), or the like. In the present specification, for convenience of description, the memory device 100 is a NAND flash memory.

The memory device 100 is configured to receive a command and an address from the memory controller 200 and access an area selected by the address in the memory cell array. The memory device 100 may perform an operation instructed by the command on the area selected by the address. For example, the memory device 100 may perform a write operation (program operation), a read operation, and an erase operation. During the program operation, the memory device 100 may program data in the area selected by the address. During the read operation, the memory device 100 may read data from the area selected by the address. During the erase operation, the memory device 100 may erase data stored in the area selected by the address.

The memory controller 200 may control an overall operation of the storage device 50.

When power is applied to the storage device 50, the memory controller 200 may execute firmware (FW). When the memory device 100 is a flash memory device, the memory controller 200 may execute firmware such as a flash translation layer (FTL) for controlling communication between the host 400 and the memory device 100.

In an embodiment, the memory controller 200 may receive data and a logical block address (LBA) from the host 400 and may convert the LBA into a physical block address (PBA) indicating an address of memory cells in which data included in the memory device 100 is to be stored.

The memory controller 200 may control the memory device 100 to perform the program operation, the read operation, or the erase operation according to a request of the host 400. During the program operation, the memory controller 200 may provide a program command, the PBA, and data to the memory device 100. During the read operation, the memory controller 200 may provide a read command and the PBA to the memory device 100. During the erase operation, the memory controller 200 may provide an erase command and the PBA to the memory device 100.

In an embodiment, the memory controller 200 may generate a command, an address, and data independently regardless of the request from the host 400 and transmit the command, the address, and the data to the memory device 100. For example, the memory controller 200 may provide the command, the address, and the data for performing the program operation, the read operation, and the erase operation accompanying in performing wear leveling, read reclaim, garbage collection, and the like, to the memory device 100.

In an embodiment, the memory controller 200 may control at least two or more memory devices 100. In this case, the memory controller 200 may control the memory devices 100 according to an interleaving method to improve operation performance. The interleaving method may be a method of controlling operations for at least two memory devices 100 to overlap with each other.

The buffer memory device 300 may temporarily store data transmitted between the host 400 and the memory device 100. That is, the buffer memory device 300 may operate as a buffer of the memory device 100. The buffer memory device 300 may include a plurality of areas in which the data is substantially stored. For example, the buffer memory device 300 may temporarily store data transmitted from the host 400 to the memory device 100 for a write operation of storing the data in the memory device 100. Alternatively, the buffer memory device 300 may temporarily store data transmitted from the memory device 100 to the host 400 for a read operation of reading data from the memory device 100. In addition, the buffer memory device 300 may temporarily store map data or temporarily store data for a background operation. The buffer memory device 300 is not limited thereto, and may be utilized as a buffer temporarily storing data when performing various operations.

The memory controller 200 may allocate the plurality of areas included in the buffer memory device 300 as areas for a specific purpose. For example, the memory controller 200 may allocate the plurality of areas in the buffer memory device 300 as a buffer of various purposes including a buffer for the write operation, the buffer for the read operation, the buffer for storing the map data, and the buffer for the background operation, respectively. In addition, the memory controller may change the purpose of the area in the buffer memory device 300 allocated as the buffer for the specific operation to an area that may be utilized as a buffer for another operation.

The host 400 may communicate with the storage device 50 using at least one of various communication standards or interfaces such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

The host 400 may include a host memory 410 and a host controller 420. Information on a process to be performed may be input to the host 400, and the information may be input by a user. Commands to be performed for a process operation may be generated by the information on the process and stored in the host memory 410. That is, the commands may be generated by a request of the user. The host controller 420 may provide a command for requesting to perform a specific operation to the storage device 50 based on the information stored in the host memory 410. For example, the host controller 420 may provide the command for requesting to perform an input process to the storage device. In another example, in preparation for the input process, the host controller 420 may provide a command for requesting to change a setting of the storage device 50 to the storage device 50 before the process is performed. In an embodiment, based on the commands stored in the host memory 410, when the host controller 420 determines that a process to be performed in the future is a process requesting a relatively large amount of read commands, in preparation for this, the host controller 420 may request the storage device 50 to change a setting capable of more smoothly processing the relatively large amount of read commands before providing a read command.

Figure 2:
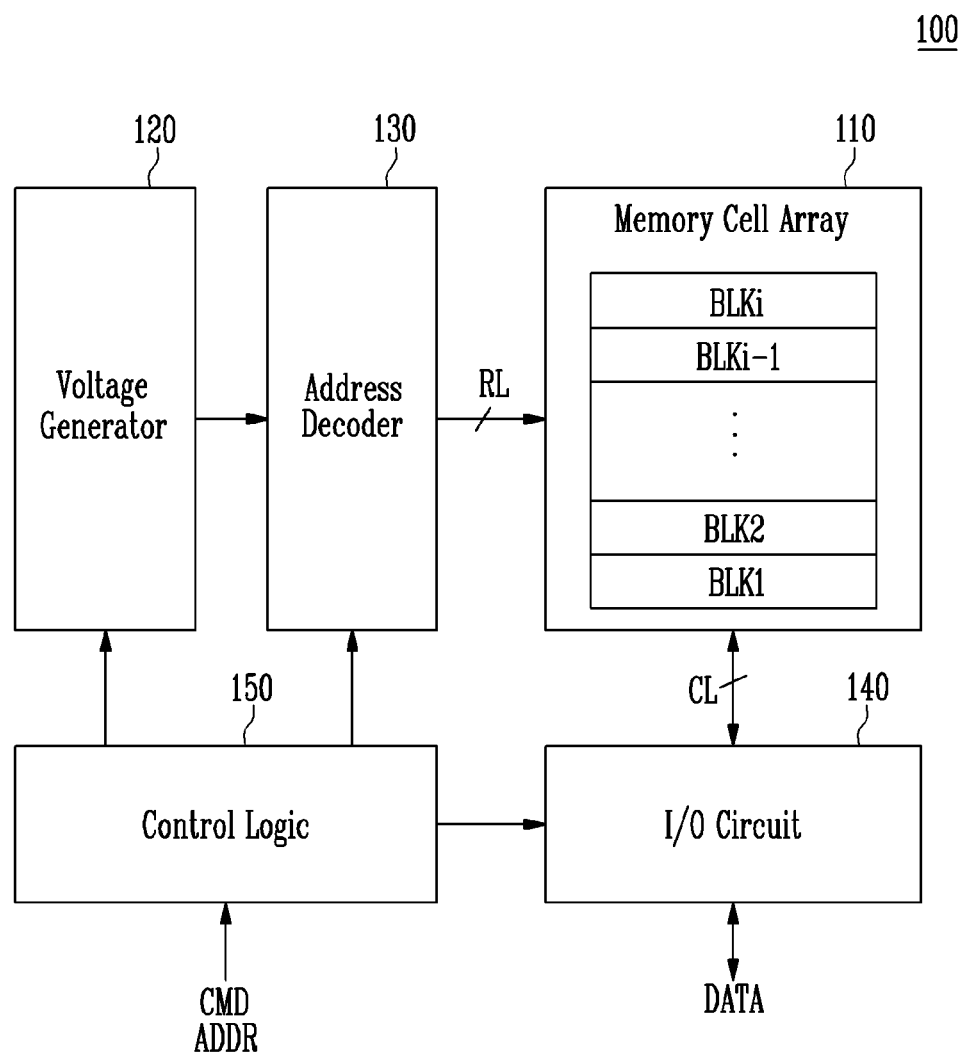
FIG. 2 is a diagram illustrating a memory device of FIG. 1 according to an embodiment of the present disclosure.

FIG. 2 is a diagram illustrating the memory device of FIG. 1 according to an embodiment of the present disclosure.

Referring to FIG. 2, the memory device 100 may include a memory cell array 110, a voltage generator 120, an address decoder 130, an input/output circuit 140, and a control logic 150.

The memory cell array 110 includes a plurality of memory blocks BLK1 to BLKi. The plurality of memory blocks BLK1 to BLKi are connected to the address decoder 130 through row lines RL. The plurality of memory blocks BLK1 to BLKi may be connected to the input/output circuit 140 through column lines CL. In an embodiment, the row lines RL may include word lines, source select lines, and drain select lines. In an embodiment, the column lines CL may include bit lines.

Each of the plurality of memory blocks BLK1 to BLKi includes a plurality of memory cells. In an embodiment, the plurality of memory cells may be nonvolatile memory cells. Memory cells connected to the same word line among the plurality of memory cells may be defined as one physical page. That is, the memory cell array 110 may include a plurality of physical pages. Each of the memory cells of the memory device 100 may be configured as a single level cell (SLC) that stores one data bit, a multi-level cell (MLC) that stores two data bits, a triple level cell (TLC) that stores three data bits, or a quad level cell (QLC) capable of storing four data bits.

In an embodiment, the voltage generator 120, the address decoder 130, and the input/output circuit 140 may be collectively referred to as a peripheral circuit. The peripheral circuit may drive the memory cell array 110 under control of the control logic 150. The peripheral circuit may drive the memory cell array 110 to perform the program operation, the read operation, and the erase operation.

The voltage generator 120 is configured to generate a plurality of operation voltages using an external power voltage supplied to the memory device 100. The voltage generator 120 operates in response to the control of the control logic 150.

In an embodiment, the voltage generator 120 may generate an internal power voltage by regulating the external power voltage. The internal power voltage generated by the voltage generator 120 is used as an operation voltage of the memory device 100.

In an embodiment, the voltage generator 120 may generate the plurality of operation voltages using an external power voltage or an internal power voltage. The voltage generator 120 may be configured to generate various voltages required in the memory device 100. For example, the voltage generator 120 may generate a plurality of erase voltages, a plurality of program voltages, a plurality of pass voltages, a plurality of selected read voltages, and a plurality of unselected read voltages.

The voltage generator 120 may include a plurality of pumping capacitors that receive the internal power voltage to generate the plurality of operation voltages having various voltage levels, and may generate the plurality of operation voltages by selectively activating the plurality of pumping capacitors in response to the control of the control logic 150.

The generated plurality of operation voltages may be supplied to the memory cell array 110 by the address decoder 130.

The address decoder 130 is connected to the memory cell array 110 through the row lines RL. The address decoder 130 is configured to operate in response to the control of the control logic 150. The address decoder 130 may receive an address ADDR from the control logic 150. The address decoder 130 may decode a block address among the received addresses ADDR. The address decoder 130 selects at least one memory block among the memory blocks BLK1 to BLKi according to the decoded block address. The address decoder 130 may decode a row address among the received addresses ADDR. The address decoder 130 may select at least one word line among word lines of a selected memory block according to the decoded row address. In an embodiment, the address decoder 130 may decode a column address among the received addresses ADDR. The address decoder 130 may connect the input/output circuit 140 and the memory cell array 110 to each other according to the decoded column address.

For example, the address decoder 130 may include components such as a row decoder, a column decoder, and an address buffer.

The input/output circuit 140 may include a plurality of page buffers. The plurality of page buffers may be connected to the memory cell array 110 through the bit lines. During the program operation, data may be stored in selected memory cells according to data stored in the plurality of page buffers. During the read operation, the data stored in the selected memory cells may be sensed through the bit lines, and the sensed data may be stored in the page buffers.

The control logic 150 may control the address decoder 130, the voltage generator 120, and the input/output circuit 140. The control logic 150 may operate in response to the command CMD transmitted from an external device. The control logic 150 may generate control signals in response to the command CMD and the address ADDR to control the peripheral circuits.

Figure 3:
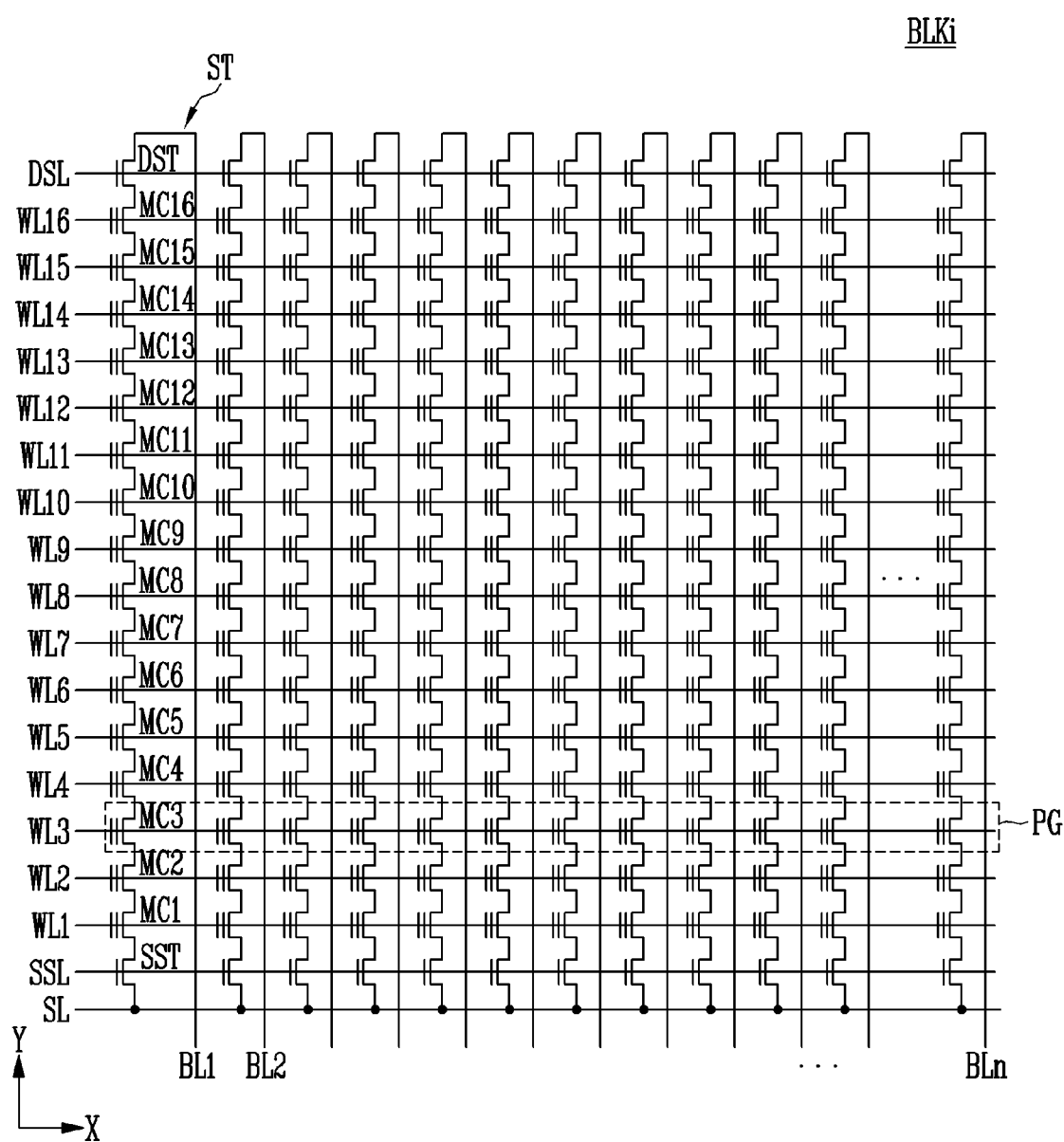
FIG. 3 is a diagram illustrating a structure of a memory block among memory blocks of FIG. 2 according to an embodiment of the present disclosure.

FIG. 3 is a diagram illustrating a structure of a memory block among the memory blocks of FIG. 2 according to an embodiment of the present disclosure.

The memory block BLKi is a memory block BLKi among the memory blocks BLK1 to BLKi of FIG. 2.

Referring to FIG. 3, a plurality of word lines arranged in parallel with each other may be connected between a first select line and a second select line. Here, the first select line may be the source select line SSL, and the second select line may be the drain select line DSL. More specifically, the memory block BLKi may include a plurality of strings ST connected between the bit lines BL1 to BLn and a source line SL. The bit lines BL1 to BLn may be connected to the strings ST, respectively, and the source line SL may be commonly connected to the strings ST. Since the strings ST may be configured to be identical to each other, a string ST connected to the first bit line BL1 is specifically described, as an example.

The string ST may include a source select transistor SST, a plurality of memory cells MC1 to MC16, and a drain select transistor DST connected in series between the source line SL and the first bit line BL1. One string ST may include at least one or more of the source select transistor SST and the drain select transistor DST, and may include a number of memory cells MC1 to MC16 which is more than the number shown in the figure.

A source of the source select transistor SST may be connected to the source line SL and a drain of the drain select transistor DST may be connected to the first bit line BL1. The memory cells MC1 to MC16 may be connected in series between the source select transistor SST and the drain select transistor DST. Gates of the source select transistors SST included in the different strings ST may be connected to the source select line SSL, gates of the drain select transistors DST may be connected to the drain select line DSL, and gates of the memory cells MC1 to MC16 may be connected to the plurality of word lines WL1 to WL16. A group of the memory cells connected to the same word line among the memory cells included in different strings ST may be referred to as a physical page PG. Therefore, the memory block BLKi may include a number of pages PG which is the same as the number of the word lines WL1 to WL16.

One memory cell may store one bit of data. This is commonly called a single level cell (SLC). In this case, one physical page PG may store one logical page (LPG) data. The one logical page (LPG) data may include a number of data bits which is the same number as cells included in one physical page PG.

The one memory cell may store two or more bits of data. In this case, one physical page PG may store two or more logical page (LPG) data.

The read operation may be performed in a physical page PG unit.

Figure 4:
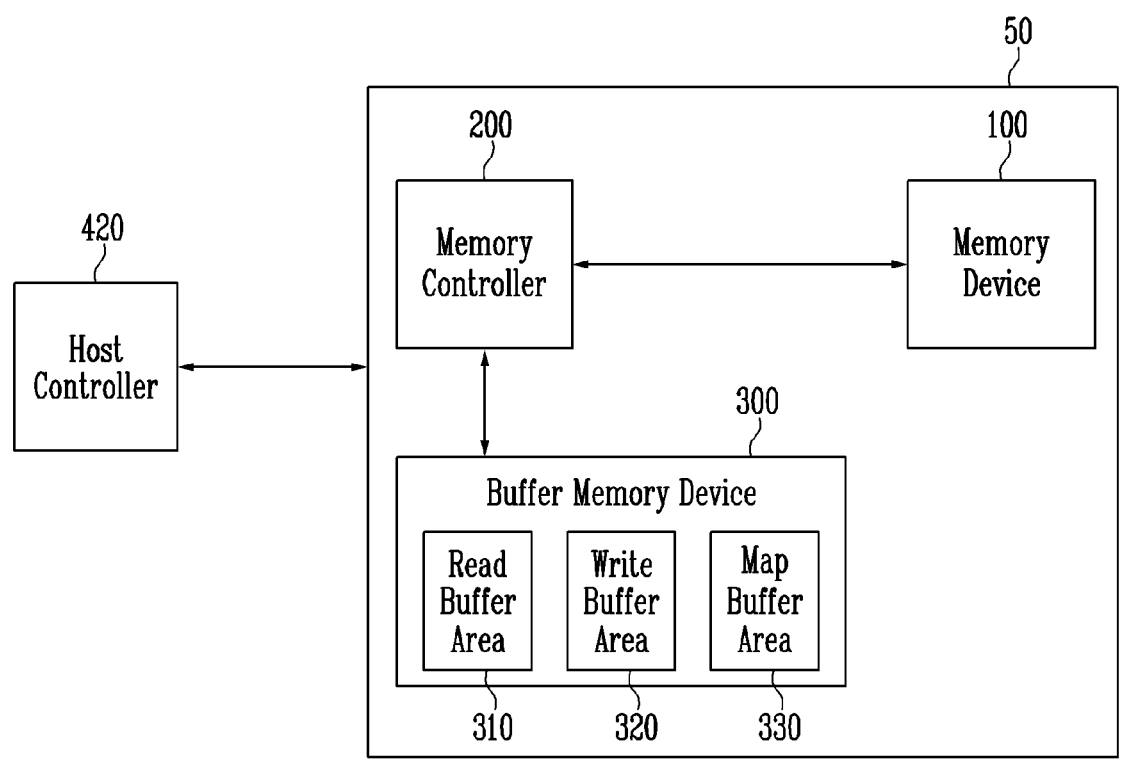
FIG. 4 is a diagram illustrating control for a buffer memory device according to an embodiment of the present disclosure.

FIG. 4 is a diagram illustrating control for a buffer memory device according to an embodiment of the present disclosure.

Referring to FIG. 4, the storage device 50 may include the memory device 100 and the buffer memory device 300, and may include the memory controller 200 controlling the memory device 100 and the buffer memory device 300. The buffer memory device 300 may include a read buffer area 310, a write buffer area 320, and a map buffer area 330, but is not limited thereto, and may include other buffer areas for various operations such as a background operation buffer area (not shown). The read buffer area 310 may temporarily store data read from the memory device 100 and the write buffer area 320 may temporarily store data to be stored in the memory device 100. Also the map buffer area 330 may fetch map data from the memory device 100, and allow the map data to be used for an operation of the storage device, such as a read operation or a write operation.

The memory controller 200 may allocate one or more of respective uses of the plurality of areas included in the buffer memory device 300. For example, a portion of the plurality of areas may be allocated as the read buffer area 310, another portion may be allocated as the write buffer area 320, and still another portion may be allocated as the map buffer area 330. The read buffer area 310 may temporarily store data transmitted from the memory device 100 to the host 400 for the read operation of reading data from the memory device 100, the write buffer area 320 may temporarily store data transmitted from the host 400 to the memory device 100 for the write operation of storing data in the device 100, and the map buffer area 330 may store map data such as a logical-to-physical address mapping table configuring a relationship between a logical address and a physical address.

The memory controller 200 may control the buffer memory device 300 to change the use of the areas allocated in the buffer memory device 300. In an embodiment, the memory controller 200 may change the use of the areas allocated in the buffer memory device 300 according to a request of the host.

The host controller 420 in the host may request the memory controller 200 to change the use of the plurality of areas of the buffer memory device 300. In an embodiment, the host controller 420 may determine that a process of requesting a relatively large amount of read commands follows, and may request to change the use of the plurality of areas of the buffer memory device 300 to prepare for this. That is, the host controller 420 may request to activate an intensive read mode capable of performing a large amount of read commands. In an embodiment, when the intensive read mode is activated, a read buffer area 310 or a map buffer area 330 may increase in the buffer memory device 300. Accordingly, performance related to the read operation may be improved by reading more data and storing it in the read buffer area 310, or fetching more map data to the map buffer area 330 and using it for the read operation.

The host controller 420 may determine whether activation of the intensive read mode of the storage device 50 is necessary based on the commands for performing a subsequent process stored in the host memory 410. For example, with respect to a series of subsequent processes, when a size of data to be read from the memory device 100 according to the read command is equal to or greater than a preset size, the host controller 420 may determine that the intensive read mode is required to be activated. In another example, when a ratio of read commands among commands to be provided to the storage device 50 by the host in the series of subsequent processes is equal to or greater than a predetermined ratio, the host controller 420 may determine that the intensive read mode is required to be activated. In still another example, when the host is required to successively provide the read command to the storage device a preset number of times or more in the series of subsequent processes, the host controller 420 may determine that the intensive read mode is required to be activated. A case in which the intensive read mode is required to be activated is not limited to the above-described examples, and various examples requiring a relatively large amount of read operations may be applied.

As described above, when the host controller 420 determines that the intensive read mode is required to be activated, the host controller 420 may provide a command indicating that the read command is scheduled to be provided to the storage device 50. Information related to whether the intensive read mode is activated may be included in the command. In an embodiment, the command may be provided in a form of a query request. In an embodiment, the query request may be a flag set query request (set flag query request) for setting an operation mode of the storage device 50, the flag set query request may include information indicating a query request for setting the operation mode of the storage device, information indicating a type of a query function related to the operation mode, and information on a flag indicating whether the intensive read mode is activated. That is, the flag set query request may be a request for setting settings for performing a specific operation of the storage device 50, and the operation mode means that the storage device 50 performs a specific operation with the specific setting. For example, the operation mode may include a normal read mode in which the storage device 50 performs a read operation with a general setting and an intensive read mode in which the storage device 50 performs a read operation with a setting in which the storage device 50 is more dedicated to the read operation. Based on the information on the flag indicating whether the intensive read mode is activated, the memory controller 200 may change the use of the plurality of areas in the buffer memory device 300. The use may be changed according to a preset setting. When the intensive read mode is activated, the memory controller 200 may change the use of at least a portion of the plurality of areas in the buffer memory device 300 to a use related to the read command to be provided from the host. In an embodiment, in response to the query request received from the host controller 420, the memory controller 200 may change at least a portion an area except for the read buffer area 310 and the map buffer area 330 among the plurality of areas to an additional portion of the read buffer area 310. In another embodiment, in response to the query request received from the host controller 420, the memory controller 200 may change at least a portion of the area except for the read buffer area 310 and the map buffer area 330 among the plurality of areas to the map buffer area 330. As described above, using the buffer memory device 300 in which at least a portion of the plurality of areas is changed, the storage device 50 may perform the subsequent process including the relatively large amount of read operations.

In an embodiment, the host controller 420 may determine that the intensive read mode no longer is required to be activated. Accordingly, the host controller 420 may request the storage device 50 to deactivate the intensive read mode, and in an embodiment, the request may be provided as a command in the form of the query request. As described above, the query request for deactivating the intensive read mode may be a flag clear query request (clear flag query request) for releasing the set mode of the storage device 50. In response to this, the memory controller 200 may release the intensive read mode activation setting, and thus the memory controller 200 may change the use of the plurality of areas in the buffer memory device 300 again. The use change may be for returning to the use before the activation of the intensive read mode or for initializing the use of the plurality of areas as initially set, but is not limited thereto, and may be for changing to a new use according to a preset setting. When the intensive read mode is deactivated, the memory controller 200 accordingly may change at least a portion of the area allocated as the use related to the read operation among the plurality of areas in the buffer memory device 300 to a use that is not related to the read operation.

Figure 5:
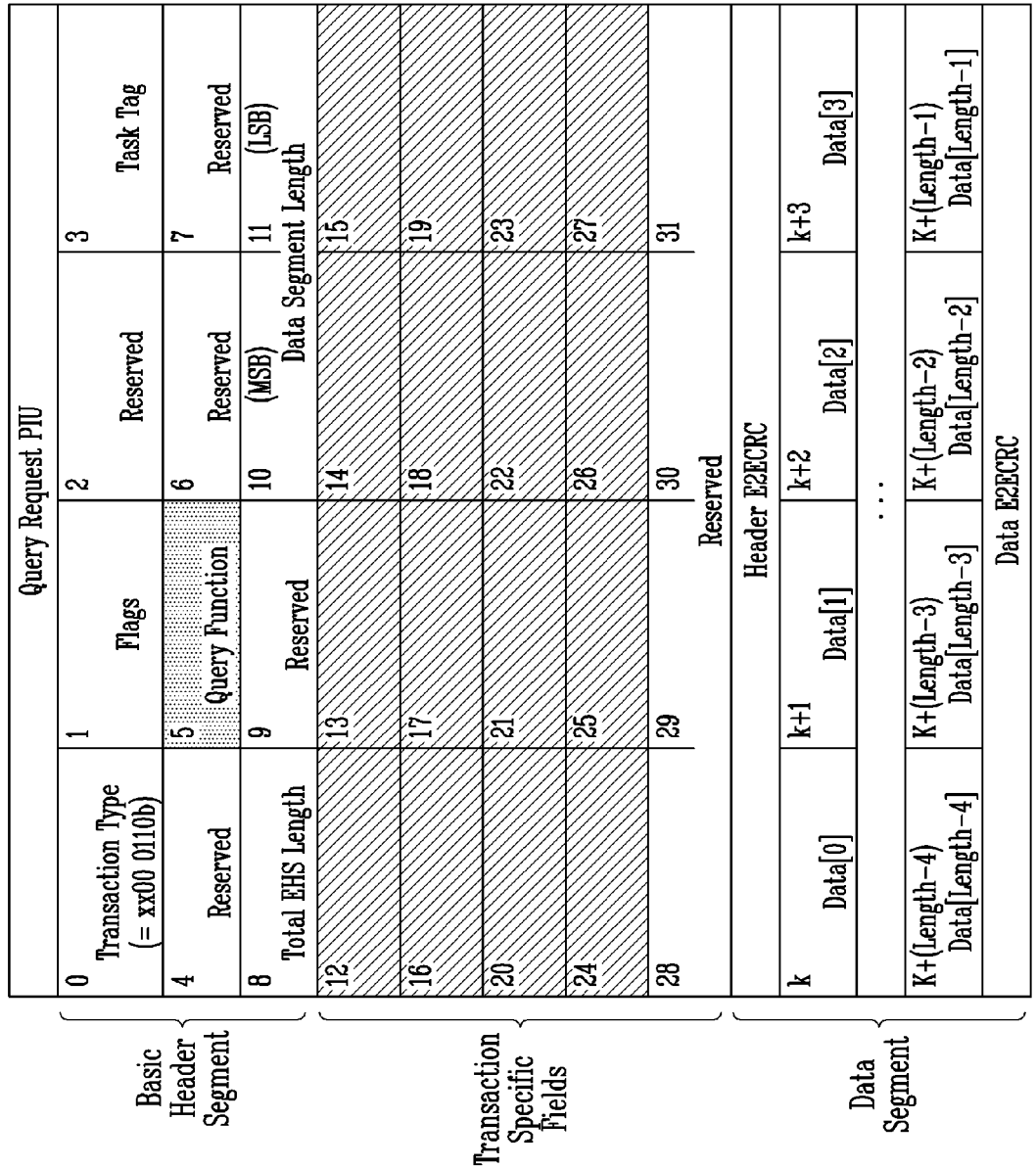
FIG. 5 is a diagram illustrating a structure of a query request protocol unit (protocol information unit (PIU)) according to an embodiment of the present disclosure.

FIG. 5 is a diagram illustrating a structure of a query request protocol unit (protocol information unit (PIU)) according to an embodiment of the present disclosure.

The query request PIU may be used to transmit data between the host and the storage device, and at this time, the data may be different from read or write operation data of a general device, and may be system data, configuration data, product information, a descriptor, a special parameter, a flag, or the like. For example, the query request PIU may be used to read or write parameter data. The query request PIU may be used to receive information on configuration or enumeration, to set or clear bus or an entire device condition, to set or receive power, bus or network information, or to receive a serial number or globally unique identifiers (GUID's). The storage device may send a query response PIU in response to the query request PIU. After sending the query request PIU, the host may not send a new query request PIU until the host receives the query response PIU from the storage device. When the storage device receives the new query request PIU while processing a previous query request PIU, the newly received query request PIU may be ignored. The query request PIU includes a field defined with respect to the query function, and otherwise follows a general PIU format.

The query function may be generally used to read or write a descriptor, an attribute, and a flag. These are general data structures transmitted using a query function, and may be used to control the storage device or define an operation. The descriptor may be a block or a page of a parameter that describes something about the storage device, and may include for example, a device descriptor, a configuration descriptor, a unit descriptor, and the like. The attribute may be a single parameter that represents a specific range of a numeric value that may be set or read, and this value may be a byte, a word, or a floating-point number. For example, the attribute may indicate a transmission speed, a block size, or the like, and a size of the attribute may be 1 bit to 32 bits. Attributes of the same type may be configured in an array, and each of a plurality of attributes configured in the array may be identified through an index. The flag may be a single Boolean value indicating a value of TRUE or FALSE, 0 or 1, ON or OFF, or the like. The flag may be cleared, reset, set, toggled, or read. The flag may be used to activate or deactivate a specific function, mode, or state in a device.

Referring to FIG. 5, the query request PIU may include a basic header segment, a transaction specific field, and a data segment.

The basic header segment may have a size of 12 bytes. The basic header segment may be commonly included in all PIUs.

The transaction specific field may be included in a byte address 31 from a byte address 12 of the PIU. The transaction specific field may include a dedicated transaction code according to a type of the PIU.

The data segment may be included in a data out PIU or a data in PIU, and may not be included in other PIUs.

The basic header segment may include a transaction type, flags, a task tag, a query function, a total extra header segment length (Total EHS Length), device information, and a data segment length.

The transaction type may have a unique value according to the type of the PIU. An example of the transaction type according to the type of the PIU is shown in [Table 1] below.

TABLE 1

| When host provides to storage device | Transaction type | When storage device provides to host | Transaction type |
|---|---|---|---|
| Command PIU | 00 0001b | Response PIU | 10 0001b |
| Data out PIU | 00 0010b | Data in PIU | 10 0010b |
| X | X | Ready to transfer PIU | 11 0001b |
| Query request PIU | 01 0110b | Query response PIU | 11 0110b |

In an embodiment, when the host provides a query request to the storage device, as the host may check in Table 1 above, the transaction type may be indicated as 01 0110b. That is, the storage device may know that a received command is the query request by referring to the transaction type of the basic header segment. The query request may be a request for setting the operation mode of the storage device. The flags may be fields having different values according to the transaction type.

The task tag may be a field having different values according to the transaction type.

The query function may be a field input to the PIU of the query request or the query response. The query function may be related to the operation mode to be set by the query request. This is described in more detail with reference to FIG. 6 below.

The total extra header segment length (Total EHS Length) may be a field indicating a size of the extra header segment in 32 bit unit. The extra header segment may be an area that may additionally store data when sufficient information is not included in the basic header segment, and may be selectively included in the PIU. The total extra header segment length (Total EHS Length) may be used when the PIU includes an extra header segment. The length of the extra header segment may be 4 byte unit. A value of the total extra header segment length (Total EHS Length) may be a value obtained by dividing the total number of bytes of the extra header segment by 4. A maximum size of the extra header segment may be 1024 bytes. When the extra header segment is not used, the total extra header segment length (Total EHS Length) may be 0.

The data segment length may be a field indicating a length of a data segment of the PIU. When the PIU does not include the data segment, the data segment length may be 0.

The transaction specific field of the query request PIU is specifically defined for each task type. In an embodiment, the transaction specific field may include information on the flag indicating whether the intensive read mode is activated. The storage device may determine a state of the intensive read mode based on the information on the flag included in the transaction specific field, and may change a setting of the storage device accordingly. This is described in more detail with reference to FIGS. 7 to 10. Herein, the state may mean whether the intensive read mode should be activated.

The data segment of the query request PIU may selectively exist according to a value of the query function. As described above, when the data segment does not exist, a data segment length field in the basic header segment may be set to 0.

FIG. 6 is a diagram illustrating a type of the query function and a field value according to an embodiment of the present disclosure.

Referring to FIGS. 5 and 6, in the basic header segment of the query request PIU, a query function field in which a query type describing a query function to be performed is expressed may exist. Referring to FIG. 6, the type of the query function may include a standard read request, a vendor specific read function, a standard write request, a vendor specific write function, and the like. A standard read request may be used to read information requested from the storage device. The storage device may transfer the requested information to the host through the query response PIU. The standard write request may be used to store information and data in the storage device. The information and the data to be stored in the storage device may be included in the data segment of the query request PIU and transferred from the host to the storage device. In an embodiment, the query function of the query request used when the intensive read mode is activated or the intensive read mode is deactivated may be the standard write request. This is described in more detail with reference to FIGS. 7 to 10 below.

FIG. 7 is a diagram illustrating a structure of the transaction specific field when the query function of the query request is the standard write request according to an embodiment of the present disclosure.

Referring to FIG. 7, the transaction specific field of the query request of which the query function is the standard write request may include an operation code (Opcode) field and an operation code specific field (OSF). The operation code field indicates an operation to be performed, and an OPCODE value related thereto is described in more detail with reference to FIG. 8 below. The OSF may define each specific operation code. In an embodiment, when the command received by the memory controller is in a form of the query request and the query function according thereto is the standard write request, the memory controller may determine a state of the intensive read mode based on the information on the flag included in the transaction specific field. In addition, the use of the plurality of areas in the buffer memory device may be changed according to the determined state of the intensive read mode.

FIG. 8 is a diagram illustrating a type of the operation code (opcode) of the query function according to an embodiment of the present disclosure.

Referring to FIGS. 7 and 8, the transaction specific field of the query request PIU may include the operation code field, and may have different operation code values according to a type of an operation. In an embodiment, the operation code may indicate whether the intensive read mode is activated. For example, in a case of a flag setting (SET FLAG) operation used to activate the intensive read mode, it may be seen from FIG. 8 that the corresponding operation code is 06h and the corresponding query function is the standard write request. In addition, in a case of a flag clear (CLEAR FLAG) operation used to deactivate the intensive read mode, it may be seen from FIG. 8 that the corresponding operation code is 07h and the corresponding query function is the standard write request.

FIG. 9 is a diagram illustrating a structure of the transaction specific field of the flag setting query request according to an embodiment of the present disclosure.

Referring to FIGS. 5 to 9, in a case of the flag setting query request, the query function field of the basic header segment may be 81h indicating the standard write request, and the OPCODE value of the transaction specific field may be 06h indicating flag setting. In addition, the transaction specific field may include a flag identification (FLAG IDN) field, which may include a value identifying a specific flag to be set in the storage device. In addition, the transaction specific field may include an index field, which may be used to identify a specific element of a flag. In addition, the transaction specific field may include a selector field, which may be used to further identify the specific element of the flag. A flag value of a specific address according thereto may be set to TRUE or 1. In addition, in a case of the flag setting query request, a data segment may not be included, and thus a value of the data segment length field in the basic header segment may be 0. In an embodiment, the flag setting query request may be provided from the host to the storage device to activate the intensive read mode, and at this time, the transaction specific field may include information on the flag indicating activation of the intensive read mode. For example, the OPCODE field may have a value indicating the flag setting, and the flag identification field may have a flag identification value indicating the flag for the intensive read mode. Therefore, when the memory controller receives such a query request, the memory controller may determine that the intensive read mode is required to be activated, and thus the memory controller may change the use of the plurality of areas in the buffer memory device.

FIG. 10 is a diagram illustrating a structure of a transaction specific field of a flag clear query request according to an embodiment of the present disclosure.

Referring to FIGS. 5 to 8 and 10, in a case of the flag clear query request, the query function field of the basic header segment may be 81h indicating the standard write request, and the OPCODE value of the transaction specific field may be 07h indicating flag clear. In addition, the transaction specific field may include the flag identification (FLAG IDN) field, which may include a value identifying a specific flag to be set in the storage device. In addition, the transaction specific field may include an index field, which may be used to identify a specific element of the flag. In addition, the transaction specific field may include a selector field, which may be used to further identify the specific element of the flag. Accordingly, the flag value of the specific address may be set to FALSE or 0. In addition, in a case of the flag query request, the data segment may not be included, and thus the value of the data segment length field in the basic header segment may be 0. In an embodiment, the flag clear query request may be provided from the host to the storage device to deactivate the intensive read mode, and at this time, the transaction specific field may include information for deactivating the intensive read mode, that is, information related for clearing the flag set for the activated intensive read mode. For example, the OPCODE field may have a value indicating flag clear, and the flag identification field may have a flag identification value indicating a flag for the intensive read mode. Therefore, when the memory controller receives the query request, the memory controller may determine that the intensive read mode is required to be deactivated, and thus the memory controller may change or initialize the use of the plurality of areas in the buffer memory device.

Figure 11:
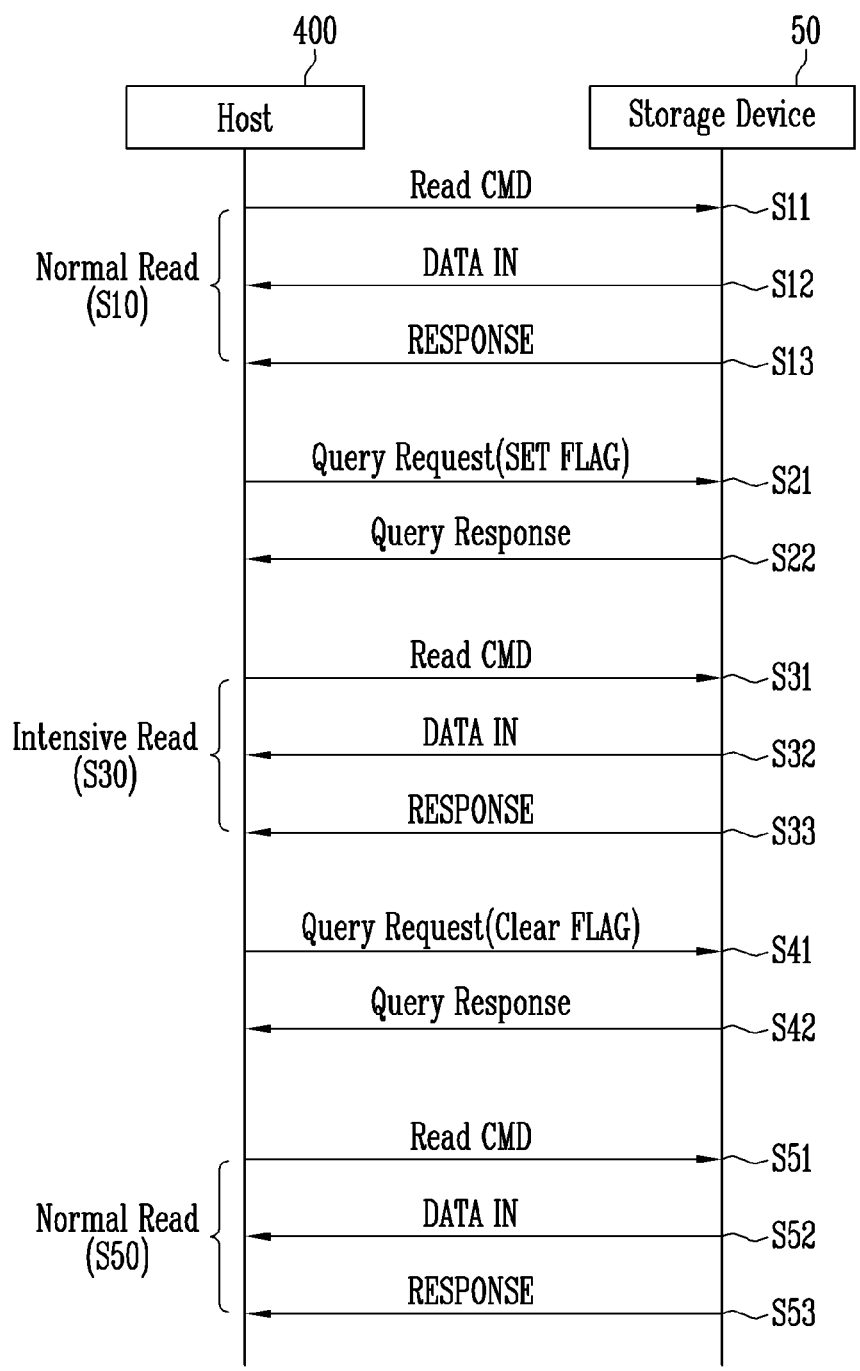
FIG. 11 is a sequence diagram illustrating an operation of a storage device according to an embodiment of the present disclosure.

FIG. 11 is a sequence diagram illustrating an operation of a storage device according to an embodiment of the present disclosure.

Referring to FIG. 11, in operation S10, the storage device 50 may perform a general normal read operation. In more detail, the storage device 50 receives the read command from the host 400 in operation S11, and thus transfers read data to the host 400 in operation S12. In operation S13, the storage device 50 replies with a response to the read command.

When the host 400 determines that the intensive read mode is required to be activated, the host 400 may provide the query request for requesting the flag setting for activating the intensive read mode to the storage device 50 as in operation S21. According to the query request, the storage device 50 may activate the intensive read mode, and when the intensive read mode activation is completed, the storage device 50 may reply to the query response to the host 400 as in operation S22.

An intensive read operation may be performed according to the activated intensive read mode in operation S30. In operation S31, the storage device 50 may receive the read command from the host 400, and may perform the read operation using a setting changed according to the intensive read mode activation. For example, when the intensive read mode is activated, the use of at least a portion of the plurality of areas in the buffer memory device may be changed to a use related to the read operation, and the read operation may be performed using the area in the buffer memory device of which the use is changed as described above. In operation S32, the storage device 50 transfers the stored data to the host 400, and in operation S33, the storage device 50 replies with a response to the read command.

When the host 400 determines that the intensive read mode is no longer required, that is, the intensive read mode is required to be deactivated, the host 400 may provide the query request for requesting the flag clear for deactivating the intensive read mode to the storage device 50 as in operation S41. According to the query request, the storage device 50 may deactivate the intensive read mode, and when the intensive read mode deactivation is completed, the storage device 50 may reply to the query response to the host 400 as in operation S42.

As the intensive read mode is deactivated, in operation S50, the storage device 50 may perform the general normal read operation again. In more detail, the storage device 50 receives the read command from the host 400 in operation S51, and thus the storage device 50 transfers the read data to the host 400 in operation S52. In operation S53, the storage device 50 replies with a response to the read command.

Figure 12:
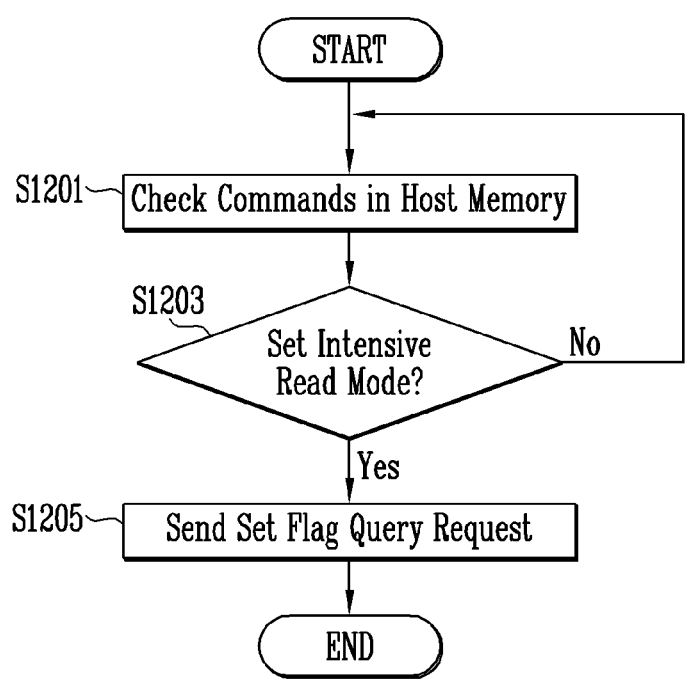
FIG. 12 is a flowchart illustrating a flag setting query request provision of a host device according to an embodiment of the present disclosure.

FIG. 12 is a flowchart illustrating a flag setting query request provision of a host device according to an embodiment of the present disclosure.

Referring to FIGS. 1 and 12, in operation S1201, the host controller 420 may check the commands stored in the host memory 410 in relation to a subsequent process. The host controller 420 checking the stored commands may determine whether to set the intensive read mode of the storage device 50 in operation S1203. When the host controller 420 determines that the intensive read mode of the storage device 50 is required to be activated (Yes in S1203), the host controller 420 may provide the flag setting query request to the storage device 50 in operation S1205. Accordingly, the storage device 50 may change the setting to the intensive read mode, and the storage device 50 may perform the read operation based on the changed setting according to the intensive read mode activation with respect to a subsequent read command. In operation S1203, when the host controller 420 determines that the intensive read mode activation of the storage device 50 is not required (No in S1203), a separate command indicating that the read command is scheduled to be provided to the storage device 50 may not be provided, and the host controller 420 may repeatedly check the commands stored in the host memory 410.

Figure 13:
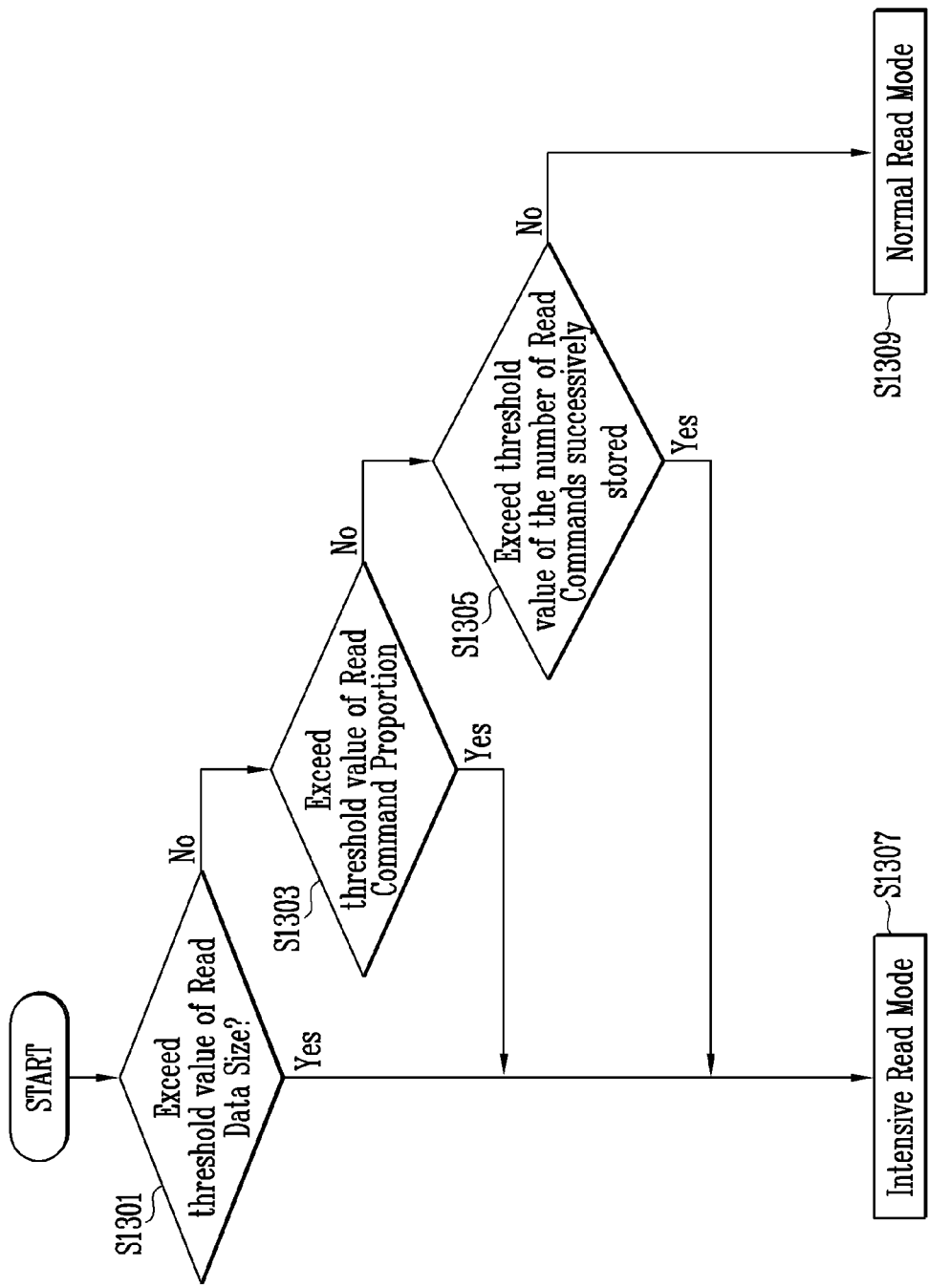
FIG. 13 is a flowchart illustrating a determination process of a host device according to an embodiment of the present disclosure.

FIG. 13 is a flowchart illustrating a determination process of a host device according to an embodiment of the present disclosure.

Referring to FIGS. 1 and 13, in operation S1301, the host controller 420 may determine whether a size of data to be read from the memory device 100 in the storage device by the read command among the commands in the host memory 410 which are related to a series of subsequent processes stored exceeds a value preset as a threshold value. When the size of the data to be read exceeds the threshold value (Yes in S1301), in operation S1307, the host controller 420 may notify the storage device 50 that the read command is scheduled to be provided in advance, and provide the query request for requesting to activate the intensive read mode. When the size of the data to be read does not exceed the threshold value (No in S1301), it may be determined whether the intensive read mode is required by additionally checking another characteristic of the commands stored in the host memory 410.

In operation S1303, the host controller 420 may determine whether a ratio of the read commands among the commands for the series of subsequent processes stored in the host memory 410 exceeds a ratio predetermined as a threshold value. When the ratio of the read commands exceeds the threshold value (Yes in S1303), the host controller 420 may notify the storage device 50 that the read command is scheduled to be provided in advance, and provide the query request for requesting to activate the intensive read mode. When the ratio of the read command does not exceed the threshold value (No in S1303), it may be determined whether the intensive read mode is required by additionally checking another characteristic of the commands stored in the host memory 410.

In operation S1305, the host controller 420 may determine whether the read command among the commands for the series of subsequent processes stored in the host memory 410 is successively stored a preset number of times or more. That is, it may be determined whether the read command is required to be successively provided to the storage device the preset number of times or more. When 1 the number of the read command is successively stored in excess of a threshold value 2 (Yes in S1305), the host controller 420 may notify the storage device 50 that the read command is scheduled to be provided in advance, and provide the query request for requesting to activate the intensive read mode. When the number of read commands stored successively is within the threshold value (No in S1305), the host controller 420 may determine that the intensive read operation is not required and may not provide a separate command preceding the read command to the storage device 50. Thus, the storage device 50 performs a general normal read operation.

Although the process in which the host determines whether the intensive read mode is required is described in FIG. 13, an item or an order of determination is not limited to that disclosed in FIG. 13, and it may be determined whether the intensive read mode is required through various other determination standards and various other determination orders.

Figure 14:
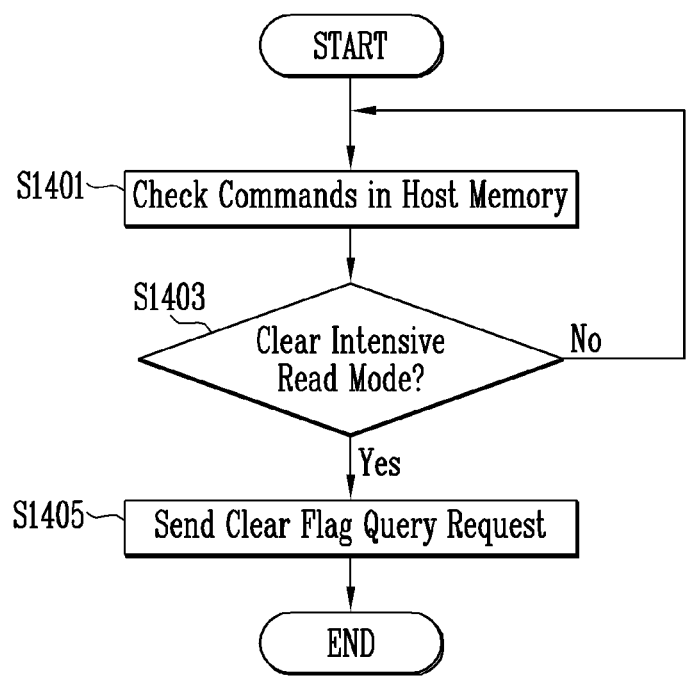
FIG. 14 is a flowchart illustrating a flag clear query request provision of a host device according to an embodiment of the present disclosure.

FIG. 14 is a flowchart illustrating a flag clear query request provision of a host device according to an embodiment of the present disclosure.

Referring to FIGS. 1, 12, and 14, in operation S1401, the host controller 420 may check the commands stored in the host memory 410 with respect to a subsequent process. At this time, the storage device 50 may receive the flag setting query request for the intensive read mode activation as shown in FIG. 12, and thus the intensive read mode may be activated. In operation S1403, the host controller 420 checking the stored commands may determine whether the intensive read mode is required to be released in the storage device 50 in which the intensive read mode is activated. When the host controller 420 determines that the intensive read mode of the storage device 50 is required to be released (Yes in S1403), the host controller 420 may provide a flag clear query request to the storage device 50 in operation S1405. Accordingly, the storage device 50 may change from a setting according to the intensive read mode to an original setting, and the storage device 50 may perform the read operation based on a general original setting according to the intensive read mode deactivation with respect to a subsequent read command. When the host controller 420 determines that the intensive read mode of the storage device 50 is continuously required in operation S1403 (No in S1403), the host controller 420 may not provide a separate additional command to the storage device 50, and thus the storage device 50 may continuously maintain the intensive read mode. In addition, the host controller 420 may repeatedly check the commands stored in the host memory 410.

Figure 15:
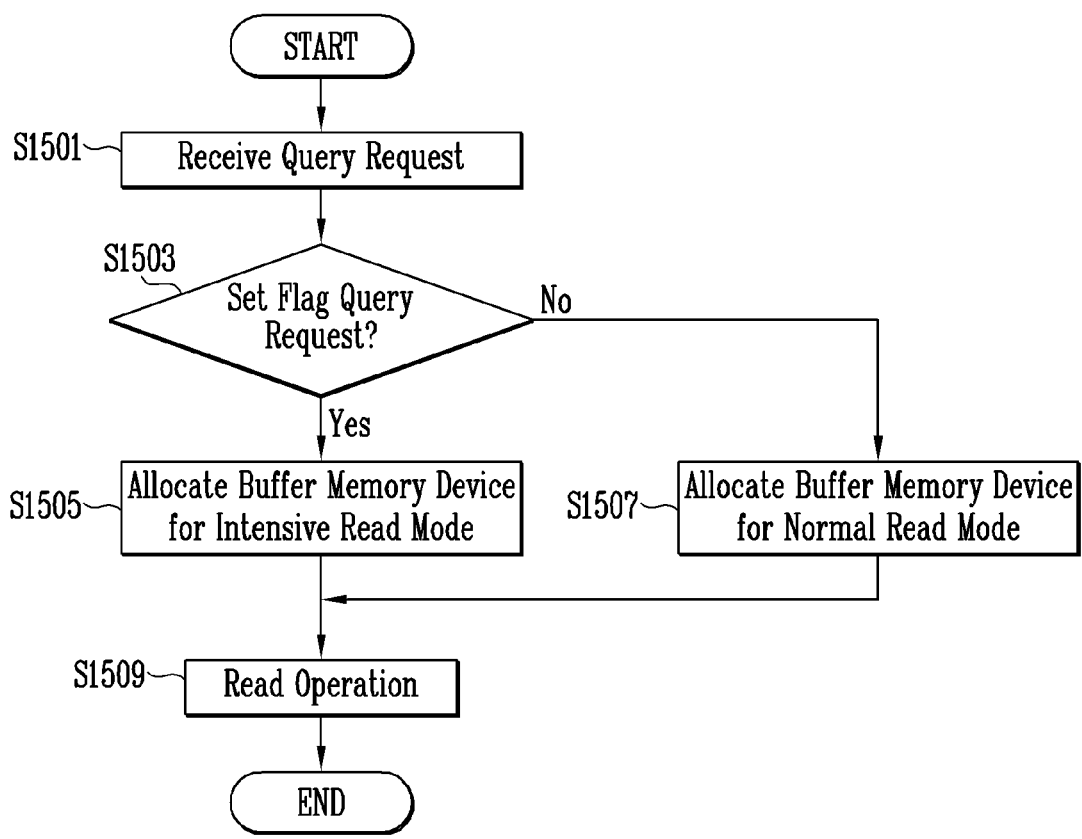
FIG. 15 is a flowchart illustrating an operation of a storage device according to an embodiment of the present disclosure.

FIG. 15 is a flowchart illustrating an operation of a storage device according to an embodiment of the present disclosure.

Referring to FIGS. 1 and 15, the storage device 50 may receive the query request in operation S1501, and the storage device 50 may determine whether the query request is the flag setting query request in operation S1503. When the ① query request is the flag setting query request ② (Yes in S1503), the buffer memory device 300 for the intensive read mode may be allocated in operation S1505, and in more detail, a portion among the plurality of areas in the buffer memory device 300 may be changed to the use related to the read command to be subsequently provided. When the query request is not the flag setting query request (No in S1503), for example, the flag clear query request, the buffer memory device 300 for the general normal read mode other than the intensive read mode may be allocated in operation S1507. In more detail, the use of the plurality of areas in the buffer memory device 300 changed according to the intensive read mode may be returned to an original use. In operation S1509, the storage device 50 may perform the read operation using the buffer memory device allocated in operations S1505 and S1507. For example, when the buffer memory device 300 for the intensive read operation is allocated as in S1505, more excellent read operation performance may be obtained. On the other hand, as in S1507, when the buffer memory device 300 for the normal read operation is allocated, the performance of the read operation may be lower than that of the intensive read operation, but it is more preferable to perform an operation other than the read operation.

Figure 16:
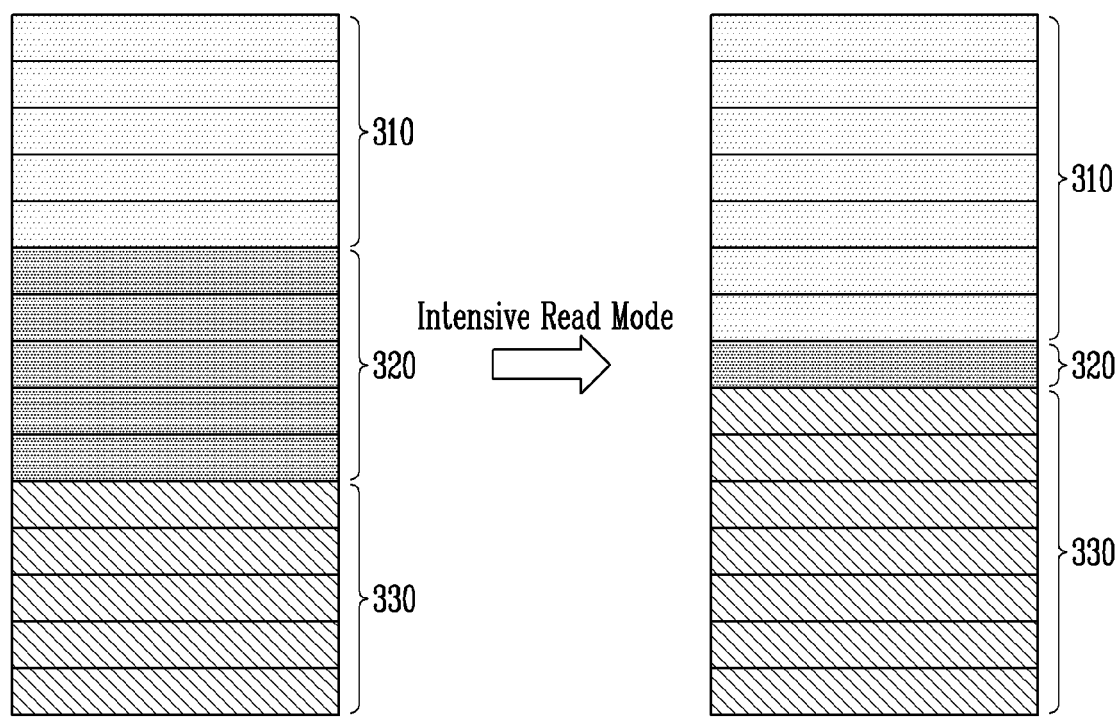
FIG. 16 is a diagram illustrating allocation of an area in a buffer memory device in response to query request reception from a storage device according to an embodiment of the present disclosure.

FIG. 16 is a diagram illustrating allocation of an area in a buffer memory device in response to query request reception from a storage device according to an embodiment of the present disclosure.

Referring to FIGS. 1, 4, and 16, the buffer memory device may include the plurality of areas, and the plurality of areas may include the read buffer area 310, the write buffer area 320, and the map buffer area 330. In addition, the plurality of areas may further include other buffer areas such as a background operation buffer area (not shown).

Allocation of the plurality of areas having various uses in the buffer memory device may be performed by the memory controller 200. When the memory controller 200 receives the query request for requesting to activate the intensive read mode from the host 400, the memory controller may change the use of the plurality of areas in the buffer memory device 300 according to the intensive read mode setting. The use may be changed according to a preset setting. When the intensive read mode is activated, the memory controller 200 may change the use of at least a portion of the plurality of areas in the buffer memory device 300 to the use related to the read command to be provided from the host 400. In an embodiment, in response to the query request received from the host 400, the memory controller 200 may change at least a portion of an area except for the read buffer area 310 and the map buffer area 330 among the plurality of areas to the read buffer area 310. In another embodiment, in response to the query request received from the host, the memory controller may change at least a portion of the area except for the read buffer area 310 and the map buffer area 330 among the plurality of areas to the map buffer area 330. For example, as shown in FIG. 16, a portion of the write buffer area 320 may be changed to an additional portion of the read buffer area 310, and another portion may be changed to the map buffer area 330. As described above, using the buffer memory device in which at least a portion of the plurality of areas is changed, the storage device 50 may perform a subsequent process including a relatively large amount of read operations.

Figure 17:
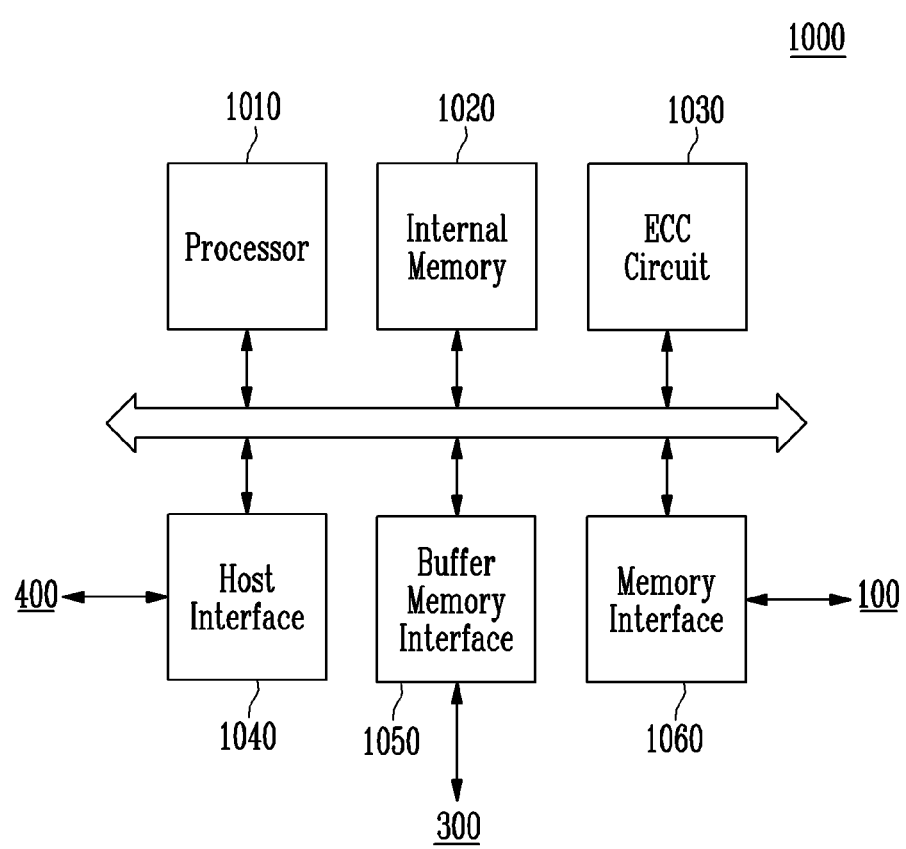
FIG. 17 is a diagram illustrating a memory controller of FIG. 1 according to an embodiment of the present disclosure.

FIG. 17 is a diagram illustrating the memory controller of FIG. 1 according to an embodiment of the present disclosure.

Referring to FIG. 17, the memory controller 1000 may include a processor 1010, an internal memory 1020, an error correction code circuit 1030, a host interface 1040, a buffer memory interface 1050, and a memory interface 1060.

The processor 1010 may perform various operations or may generate various commands for controlling the memory device 100. When receiving a request from the host 400, the processor 1010 may generate a command according to the received request and transmit the generated command to a queue controller (not shown).

The internal memory 1020 may store various pieces of information necessary for an operation of the memory controller 1000. For example, the internal memory 1020 may include logical and physical address map tables. The internal memory 1020 may be configured of at least one of a random access memory (RAM), a dynamic RAM (DRAM), a static RAM (SRAM), a cache, and a tightly coupled memory (TCM).

The error correction code circuit 1030 is configured to detect and correct an error of data received from the memory device 100 using an error correction code (ECC). The processor 1010 may adjust a read voltage according to an error detection result of the error correction code circuit 1030 and control the memory device 100 to perform re-reading. In an embodiment, an error correction block may be provided as a component of the memory controller 1000.

The host interface 1040 may exchange a command, an address, and data between the memory controller 1000 and the host 400. For example, the host interface 1040 may receive a request, an address, and data from the host 400, and may output data read from the memory device 100 to the host 400. The host interface 1040 may communicate with the host 400 using communication standards or interfaces such as universal serial bus (USB), serial AT attachment (SATA), serial attached SCSI (SAS), high speed interchip (HSIC), small computer system interface (SCSI), peripheral component interconnection (PCI), PCI express (PCIe), non-volatile memory express (NVMe), universal flash storage (UFS), secure digital (SD), multimedia card (MMC), embedded MMC (eMMC), dual in-line memory module (DIMM), registered DIMM (RDIMM), load reduced DIMM (LRDIMM), enhanced small disk interface (ESDI), or integrated drive electronics (IDE). The host interface 1040 may receive the command indicating that the read command for requesting data stored in the memory device is scheduled to be provided from the host 400. Such a command may be received in a form of the query request.

The buffer memory interface 1050 may transmit data between the processor 1010 and the buffer memory device 300.) The buffer memory device 300 may be used as an operation memory or a cache memory of the memory controller 1000, and may store data used in the storage device 50. The buffer memory interface 1050 may use the buffer memory device 300 as a read buffer, a write buffer, a map buffer, a background operation buffer, and the like, by the processor 1010. In addition, the buffer memory interface 1050 may change the use of the buffer memory device according to a request of the processor 1010. For example, when the host interface 1040 receives the command indicating that the read command for requesting data stored in the memory device is scheduled to be provided from the host 400, the buffer memory interface 1050 may change the use of at least a portion among the plurality of areas in the buffer memory device 300 to the use related to the read command to be provided, according to the request of the processor 1010. For example, when the buffer memory device includes the read buffer area, the write buffer area, the background operation buffer area, the map buffer area, and the like, the buffer memory device interface may change at least a portion of an area except for the read buffer area and the map buffer area among the read buffer area, the write buffer area, the background operation buffer area, the map buffer area, and the like to an additional portion of the read buffer area or the map buffer area.

According to an embodiment, the buffer memory device 300 may include a double data rate synchronous dynamic random access memory (DDR SDRAM), DDR4 SDRAM, low power double data rate4 (LPDDR4) SDRAM, graphics double data rate (GDDR) SDRAM, low power DDR (LPDDR), or Rambus dynamic random access memory (RDRAM). When the buffer memory device is included in the memory controller 1000, the buffer memory interface 1050 may be omitted.

The memory interface 1060 may exchange the command, the address, and the data between the memory controller 1000 and the memory device 100. For example, the memory interface 1060 may transmit the command, the address, the data, and the like to the memory device 100 and may receive the data and the like from the memory device 100 through a channel.

Figure 18:
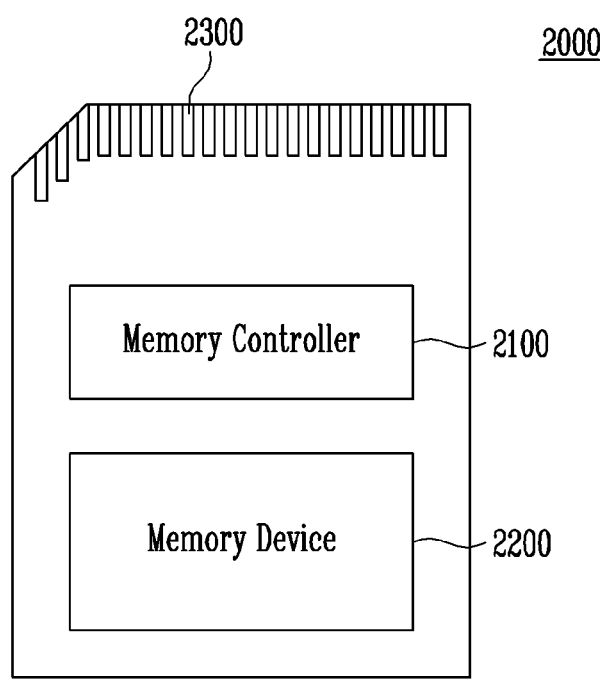
FIG. 18 is a block diagram illustrating a memory card system to which a storage device according to an embodiment of the present disclosure is applied.

FIG. 18 is a block diagram illustrating a memory card system to which a storage device according to an embodiment of the present disclosure is applied.

Referring to FIG. 18, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 may be configured to control read, program, erase, and background operations of the memory device 2200. The memory controller 2100 is configured to provide an interface between the memory device 2200 and a host. The memory controller 2100 is configured to drive firmware for controlling the memory device 2200. The memory controller 2100 may be implemented identically to the memory controller 200 described with reference to FIG. 1. The memory controller 2100 may control the memory device 2200 according to a command received from the host. In an embodiment, the memory controller 2100 may receive that the read command is scheduled to be provided from the host, and thus a setting of the memory controller 2100, the memory device 2200, or the buffer memory device (not shown) may be changed according to the intensive read mode. In addition, in an embodiment, the memory controller 2100 may receive the read command from the host, and thus the memory controller 2100 may read data from the memory device 2200 and provide the data to the host For example, the memory controller 2100 may include components such as a random access memory (RAM), a processor, a host interface, a memory interface, and an error corrector.

The memory controller 2100 may communicate with an external device through the connector 2300. The memory controller 2100 may communicate with an external device (for example, the host) according to a specific communication standard. For example, the memory controller 2100 is configured to communicate with an external device through at least one of various communication standards or interfaces such as a universal serial bus (USB), a multimedia card (MMC), an embedded MMC (eMMC), a peripheral component interconnection (PCI), a PCI express (PCI-e or PCIe), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 2300 may be defined by at least one of the various communication standards or interfaces described above.

For example, the memory device 2200 may be configured of various nonvolatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin transfer torque-magnetic RAM (STT-MRAM).

The memory controller 2100 and the memory device 2200 may be integrated into one semiconductor device to configure a memory card. For example, the memory controller 2100 and the memory device 2200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 19:
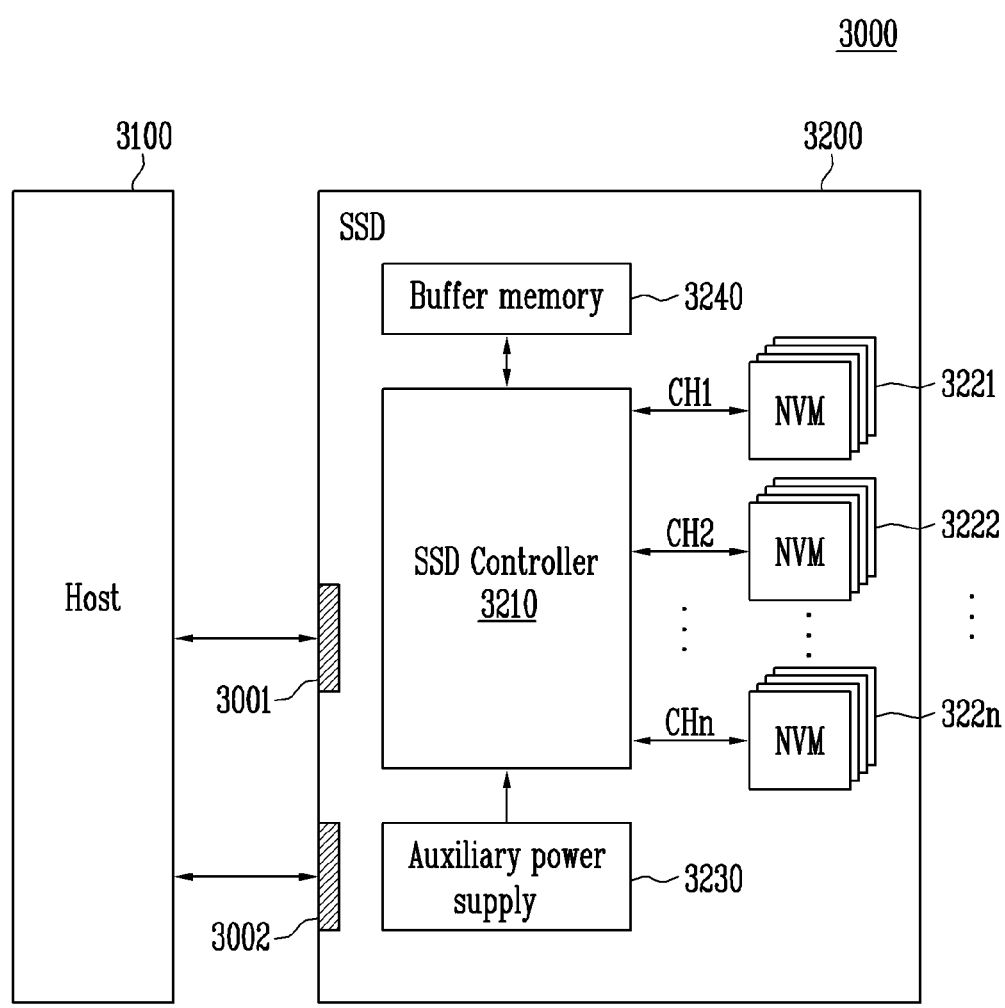
FIG. 19 is a block diagram illustrating a solid state drive (SSD) system to which a storage device according to an embodiment of the present disclosure is applied.

FIG. 19 is a block diagram illustrating a solid state drive (SSD) system to which a storage device according to an embodiment of the present disclosure is applied.

Referring to FIG. 19, the SSD system 3000 includes a host 3100 and an SSD 3200. The SSD 3200 exchanges a signal with the host 3100 through a signal connector 3001 and receives power through a power connector 3002. The SSD 3200 includes an SSD controller 3210, a plurality of flash memories 3221 to 322n, an auxiliary power supply 3230, and a buffer memory 3240.

According to an embodiment of the present disclosure, the SSD controller 3210 may perform the function of the memory controller 200 described with reference to FIG. 1.

The SSD controller 3210 may control the plurality of flash memories 3221 to 322n in response to a signal received from the host 3100. For example, the signal may be signals based on an interface between the host 3100 and the SSD 3200. For example, the signal may be a signal defined by at least one of communication standards or interfaces such as a universal serial bus (USB), a multimedia card (MMC), an embedded MMC (eMMC), a peripheral component interconnection (PCI), a PCI express (PCI-e or PCIe), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power supply 3230 is connected to the host 3100 through the power connector 3002. The auxiliary power supply 3230 may receive the power from the host 3100 and may charge the power. The auxiliary power supply 3230 may provide power to the SSD 3200 when power supply from the host 3100 is not smooth. For example, the auxiliary power supply 3230 may be positioned in the SSD 3200 or may be positioned outside the SSD 3200. For example, the auxiliary power supply 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store meta data (for example, a mapping table) of the flash memories 3221 to 322n. The buffer memory 3240 may include a volatile memory such as a DRAM, an SDRAM, a DDR SDRAM, an LPDDR SDRAM, and a GRAM, or a nonvolatile memory such as an FRAM, a ReRAM, an STT-MRAM, and a PRAM. A use of the buffer memory 3240 may be changed according to control of the SSD controller 3210. In an embodiment, the SSD controller 3210 may change the use of the buffer memory 3240 to be more suitable for performing the read operation.

Figure 20:
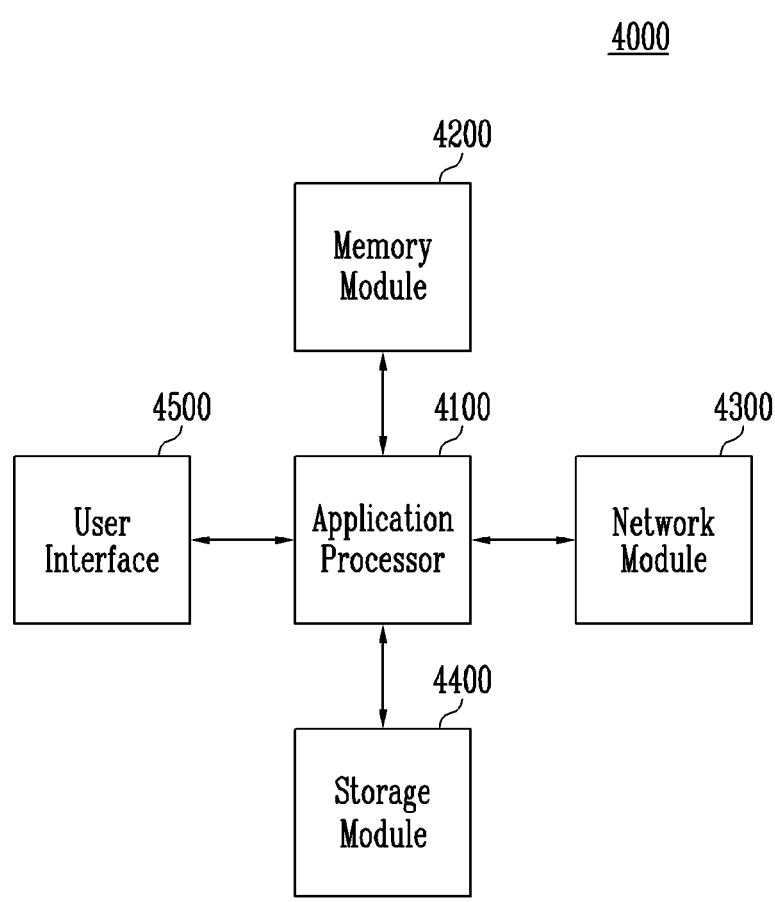
FIG. 20 is a block diagram illustrating a user system to which a storage device according to an embodiment of the present disclosure is applied.

FIG. 20 is a block diagram illustrating a user system to which a storage device according to an embodiment of the present disclosure is applied.

Referring to FIG. 20, the user system 4000 includes an application processor 4100, a memory module 4200, a network module 4300, a storage module 4400, and a user interface 4500.

The application processor 4100 may drive components, an operating system (OS), a user program, or the like included in the user system 4000. For example, the application processor 4100 may include controllers, interfaces, graphics engines, and the like that control the components included in the user system 4000. The application processor 4100 may be provided as a system-on-chip (SoC). The application processor 4100 may first determine commands to be provided to the storage module 4400 in the future, and may provide the command indicating that the read command is scheduled to be provided, to the storage module 4400 in advance before providing the read command.

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a nonvolatile random access memory, such as a PRAM, a ReRAM, an MRAM, and an FRAM. For example, the application processor 4100 and memory module 4200 may be packaged based on a package on package (POP) and provided as one semiconductor package.

The network module 4300 may communicate with external devices. For example, the network module 4300 may support wireless communication such as code division multiple access (CDMA), global system for mobile communications (GSM), wideband CDMA (WCDMA), CDMA-2000, time division multiple access (TDMA), long term evolution, WiMAX, WLAN, UWB, Bluetooth, and Wi-Fi. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented with a nonvolatile semiconductor memory element such as a phase-change RAM (PRAM), a magnetic RAM (MRAM), a resistive RAM (RRAM), a NAND flash, a NOR flash, and a three-dimensional NAND flash. For example, the storage module 4400 may be provided as a removable storage device (removable drive), such as a memory card, and an external drive of the user system 4000.

For example, the storage module 4400 may include a plurality of nonvolatile memory devices, and the plurality of nonvolatile memory devices may operate identically to the memory device 100 described with reference to FIG. 1. The storage module 4400 may operate identically to the storage device 50 described with reference to FIG. 1.

The user interface 4500 may include interfaces for inputting data or an instruction to the application processor 4100 or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

Although various embodiments have been described for illustrative purposes, it will be apparent to those skilled in the art that various changes and modifications may be made without departing from the spirit and scope of the invention as defined in the following claims. Furthermore, the embodiments may be combined to form additional embodiments.

What is claimed is:

1. A storage device comprising:
 a main memory device;
 a buffer memory device including a plurality of areas and operating as a buffer of the main memory device; and
 a memory controller configured to change one or more of respective uses of the plurality of areas in response to a preparation command indicating that one or more read commands for requesting data stored in the main memory device are to be provided, which is received from an external host,
 wherein the preparation command comprises a transaction specific field including information on a flag indicating whether an intensive read mode is activated, and
 wherein the information on the flag includes an operation code indicating whether the intensive read mode is activated and a flag identification value indicating a flag for the intensive read mode.

2. The storage device of claim 1, wherein the preparation command further comprises:
 a basic header segment including information indicating that the preparation command is a query request for setting an operation mode of the storage device and information indicating a type of a query function associated with the operation mode.

3. The storage device of claim 2,
wherein the memory controller is further configured to determine, when the query function is a standard write request, whether to activate the intensive read mode based on the information on the flag, and
wherein the memory controller changes the one or more respective uses of the plurality of areas according to the determination of the intensive read mode.

4. The storage device of claim 1, wherein the memory controller is configured to activate the intensive read mode when the operation code includes information which indicates to set the flag.

5. The storage device of claim 4, wherein the plurality of areas include a read buffer area, a write buffer area, a background operation buffer area, and a map buffer area.

6. The storage device of claim 5, wherein the memory controller changes the one or more respective uses of the plurality of areas by controlling, when the intensive read mode is activated, the buffer memory device to change at least a portion of an area except for the read buffer area and the map buffer area among the plurality of areas to an additional read buffer area.

7. The storage device of claim 5, wherein the memory controller changes the one or more respective uses of the plurality of areas by controlling, when the intensive read mode is activated, the buffer memory device to change at least a portion of an area except for the read buffer area and the map buffer area among the plurality of areas to an additional map buffer area.

8. The storage device of claim 1, wherein the memory controller is configured to deactivate the intensive read mode when the operation code includes information which indicates to clear the flag.

9. The storage device of claim 8, wherein the memory controller is further configured to control, when the intensive read mode is deactivated, the buffer memory device to initialize the one or more respective uses of the plurality of areas to preset uses.

10. A memory controller that controls a main memory device and a buffer memory device operating as a buffer of the main memory device and including a plurality of areas, the memory controller comprising:
a host interface configured to receive a preparation command indicating that one or more read commands for requesting data stored in the main memory device are to be provided from an external host; and
a buffer memory device interface configured to change one or more respective uses of the plurality of areas in response to the preparation command,
wherein the preparation command comprises a transaction specific field including information on a flag indicating whether an intensive read mode is activated, and
wherein the information on the flag includes an operation code indicating whether the intensive read mode is activated and a flag identification value indicating a flag for the intensive read mode.

11. The memory controller of claim 10, wherein the buffer memory device interface changes the one or more respective uses of the plurality of areas to a use related to the read command.

12. The memory controller of claim 11, wherein the plurality of areas include a read buffer area, a write buffer area, a background operation buffer area, and a map buffer area.

13. The memory controller of claim 12, wherein the buffer memory device interface changes the one or more respective uses of the plurality of areas by controlling the buffer memory device to change at least a portion of an area except for the read buffer area and the map buffer area among the plurality of areas to an additional read buffer area or an additional map buffer area.

14. A host device comprising:
a host memory configured to store therein commands generated according to a request of a user; and
a host controller configured to provide a storage device with a preparation command indicating that one or more read commands are scheduled to be provided to the storage device, based on the stored commands in the host memory which include the one or more read commands,
wherein the preparation command comprises:
a basic header segment including information indicating that the preparation command is a query request for setting an operation mode of the storage device and information indicating a type of a query function associated with the operation mode; and
a transaction specific field including information on a flag indicating whether an intensive read mode is activated, and
wherein the information on the flag includes an operation code indicating whether the intensive read mode is activated and a flag identification value indicating a flag for the intensive read mode.

15. The host device of claim 14, wherein the host controller provides the storage device with the preparation command when a size of data to be read from the storage device according to the one or more read commands is equal to or greater than a preset size.

16. The host device of claim 14, wherein the host controller provides the storage device with the preparation command when a ratio of the one or more read commands among the stored commands in the host memory is equal to or greater than a predetermined ratio.

17. The host device of claim 14, wherein when at least some of the one or more read commands are successively stored in the host memory a predetermined number of times or more, the host controller provides the storage device with the preparation command.

18. The host device of claim 14, wherein the preparation command includes information related to change of one or more respective uses of a buffer memory device in the storage device.

19. The host device of claim 18, wherein the host controller is further configured to provide, based on the stored commands in the host memory, the storage device with a command including information related to initializing changed uses of the buffer memory device to a preset use.

* * * * *